US007395662B2

(12) United States Patent
Kauss

(10) Patent No.: US 7,395,662 B2
(45) Date of Patent: Jul. 8, 2008

(54) HYDRAULIC CONTROL ARRANGEMENT

(75) Inventor: Wolfgang Kauss, Francheville (FR)

(73) Assignee: Bosch Rexroth AG, Stuttgart (DE)

( * ) Notice: Subject to any disclaimer, the term of this patent is extended or adjusted under 35 U.S.C. 154(b) by 376 days.

(21) Appl. No.: 10/558,380

(22) PCT Filed: May 28, 2004

(86) PCT No.: PCT/EP2004/005835

§ 371 (c)(1),
(2), (4) Date: Jan. 23, 2006

(87) PCT Pub. No.: WO2004/109019

PCT Pub. Date: Dec. 16, 2004

(65) Prior Publication Data

US 2006/0218914 A1 Oct. 5, 2006

(30) Foreign Application Priority Data

Jun. 4, 2003 (DE) ................................ 103 25 295

(51) Int. Cl.
*F16D 31/02* (2006.01)

(52) U.S. Cl. .......................................... 60/399; 91/447

(58) Field of Classification Search .................. 60/399; 91/447

See application file for complete search history.

(56) References Cited

U.S. PATENT DOCUMENTS 6,289,675 B1 9/2001 Herfs et al.
6,526,747 B2 3/2003 Nakatani et al.

FOREIGN PATENT DOCUMENTS

| | | | |
|---|---|---|---|
| DE | 42 30 183 | A1 | 3/1993 |
| DE | 102 24 731 | A1 | 1/2003 |
| EP | 0 801 231 | A1 | 10/1997 |
| EP | 1 164 297 | A1 | 12/2001 |
| EP | 1 262 667 | A1 | 12/2002 |
| JP | A-56-018102 | | 2/1981 |

*Primary Examiner*—F. Daniel Lopez
(74) *Attorney, Agent, or Firm*—Oliff & Berridge, PLC

(57) ABSTRACT

A hydraulic control arrangement is disclosed for the control of a consumer, comprising at least one mechanically operated continuously adjustable distribution valve with a subsequent LUDV pressure compensator down the line. In order to lock the consumer the control arrangement is provided with a spring holding the pressure compensator piston in a closed position. Furthermore, the LS line carrying the highest load pressure of all consumers is connected to a reservoir by means of a flow regulator, wherein the pump control may also be relieved by the flow regulator in the sense of a reduction of the pumped volume. According to the invention, the LUDV pressure compensator is pressure-compensated by means of a nozzle through which a connection between the LS line and a portion of the pressure medium flow path downstream of the pump and upstream of the outlet of the pressure compensator is generated. Said nozzle is preferably integrated in the pressure compensator piston.

17 Claims, 2 Drawing Sheets

HYDRAULIC CONTROL ARRANGEMENT

Figure 1:
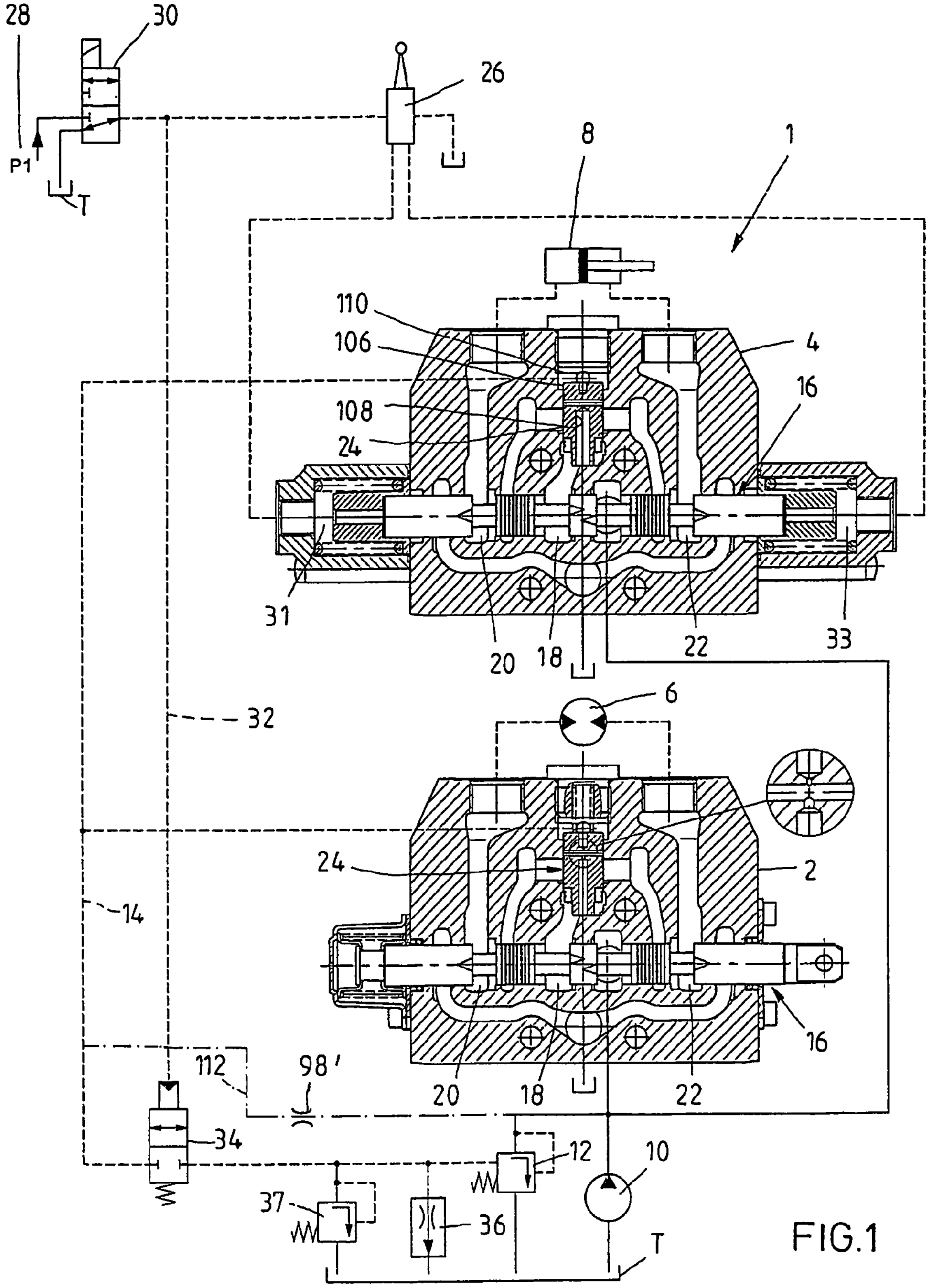

The invention relates to a hydraulic control arrangement for a load-independent control of a consumer.

Mobile working implements, for instance mini excavators and compact excavators, are increasingly equipped with hydraulic control arrangements which distribute the volume flow of pressure medium of one single pump in a load-independent manner to the connected consumers. The control of these consumers is performed, for instance, via a load-pressure independent flow distribution LUDV[1] control block including a plurality of valve disks each corresponding to one of the consumers. In each valve disk a continuously adjustable distribution valve is accommodated which is provided with a pressure-compensating LUDV pressure compensator. The pressure medium flowing to the consumer first flows through a metering orifice formed by the continuously adjustable distribution valve and then through the pressure compensator. The control piston of this pressure compensator is loaded at its front side with the pressure prevailing between the metering orifice and the pressure compensator. This pressure is reduced vis-à-vis the pump pressure by the largely load-pressure and pump-pressure independent pressure drop above the metering orifice. In the closing direction the maximum load pressure of all simultaneously operated hydraulic consumers is applied to the control piston of the pressure compensator. This means that also between the metering orifice and the pressure compensator the maximum load pressure is prevailing and that the partial amounts of pressure medium flowing to all simultaneously operated hydraulic consumers are reduced independently of individual load pressures of the consumers at the same ratio when upon increase of the opening cross-sections of the metering orifice the maximum pumped amount of the corresponding pump is reached.

[1] German abbreviation (Lastdruck unabhängige Durchflussverteilung)

In the case of mini excavators and compact excavators, frequently the working functions of boom, shovel, post and turning are operated via hydraulic pilot devices, while the functions of driving, buckling, blade and hammer are usually operated mechanically for reasons of costs. Safety means which the driver has to activate upon leaving the driver's seat in order to interrupt the mechanically and hydraulically operated functions are legally prescribed. Interrupting the hydraulically operated functions is relatively simple, because merely the supply of the pilot device with control oil has to be interrupted. What is more difficult is to lock the mechanically operated functions. It is known to use mechanical positive or non-positive locks which are comparatively expensive to realize, however.

In U.S. Pat. No. 6,526,747 B2 a solution is disclosed in which the hydraulically and mechanically operated functions are locked by applying the pump pressure to the LUDV pump compensators in the closing direction and thus stopping the supply of pressure medium to the consumer. This pump pressure acts upon operating the safety means via a distribution valve in the load pressure line of the control block common to all consumers, which distribution valve is operated by means of an interrupting valve, the pressure in the control oil supply being used for changing over the distribution valve. Such a solution requires a considerable effort in terms of circuitry.

Compared to that, the object underlying the invention is to provide a hydraulic control arrangement in which the locking of the mechanically operated consumers is simplified.

According to the invention, the LUDV pressure compensators corresponding to the mechanically operated distribution valves are loaded by a spring acting in the closing direction. Moreover, the load pressure detecting line common to all consumers is connected to the reservoir via a flow regulator so that a small amount of control oil constantly flows off toward the reservoir. In this load pressure line a safety valve is arranged by which the connection of the load pressure detecting line to the flow regulator can be locked. An area upstream of the on-off valve is connected via a nozzle to a portion of the pressure medium flow path between the pump and the LUDV pressure compensator.

When changing over the safety valve to a stop position the connection of the load pressure detecting line to the reservoir is locked and the pressure tapped off via the nozzle is effective in a rear control chamber connected to the load pressure detecting line so that the LUDV pressure compensator is brought into its closed position. The load pressure detecting line is connected downstream of the flow regulator to a pump control. After locking the load pressure detecting line also the control pressure at the pump control drops toward the reservoir so that the pump can only generate the standby pressure.

The solution according to the invention excels by a very simple structure and a good response behavior.

In two preferred embodiments of the invention the nozzle arranged upstream of the safety valve is either integrated in the pressure compensator, wherein the pressure applied to the inlet of the pressure compensator is signaled to the rear control chamber by means of this nozzle so that the pressure compensator piston is pressure-compensated and is closed by the force of the additional spring.

In the case of the alternative solution this nozzle is provided in a branch line extending from an area upstream of the distribution valve to an area upstream of the safety valve. In this case, the pump pressure applied upstream of the distribution valve is signaled to the rear pressure chamber.

In an embodiment of the invention the pump supplying the consumers is in the form of a fixed displacement pump provided with a differential pressure regulator which is controlled in response to the load pressure in the load pressure detecting line.

In an especially preferred embodiment of the invention, each of the hydraulically operated consumers is controlled by means of a pilot device which is provided with a separate control oil supply.

In this control oil supply an interrupting valve is provided by which the control oil supply of the pilot device is interrupted for locking the hydraulically operated consumers so that the slide valves thereof are returned to the spring-biased home position. According to the invention, the safety valve is also actuated by the change-over of this interrupting valve.

Other advantageous further developments of the invention are the subject matter of further subclaims.

Figure 2:
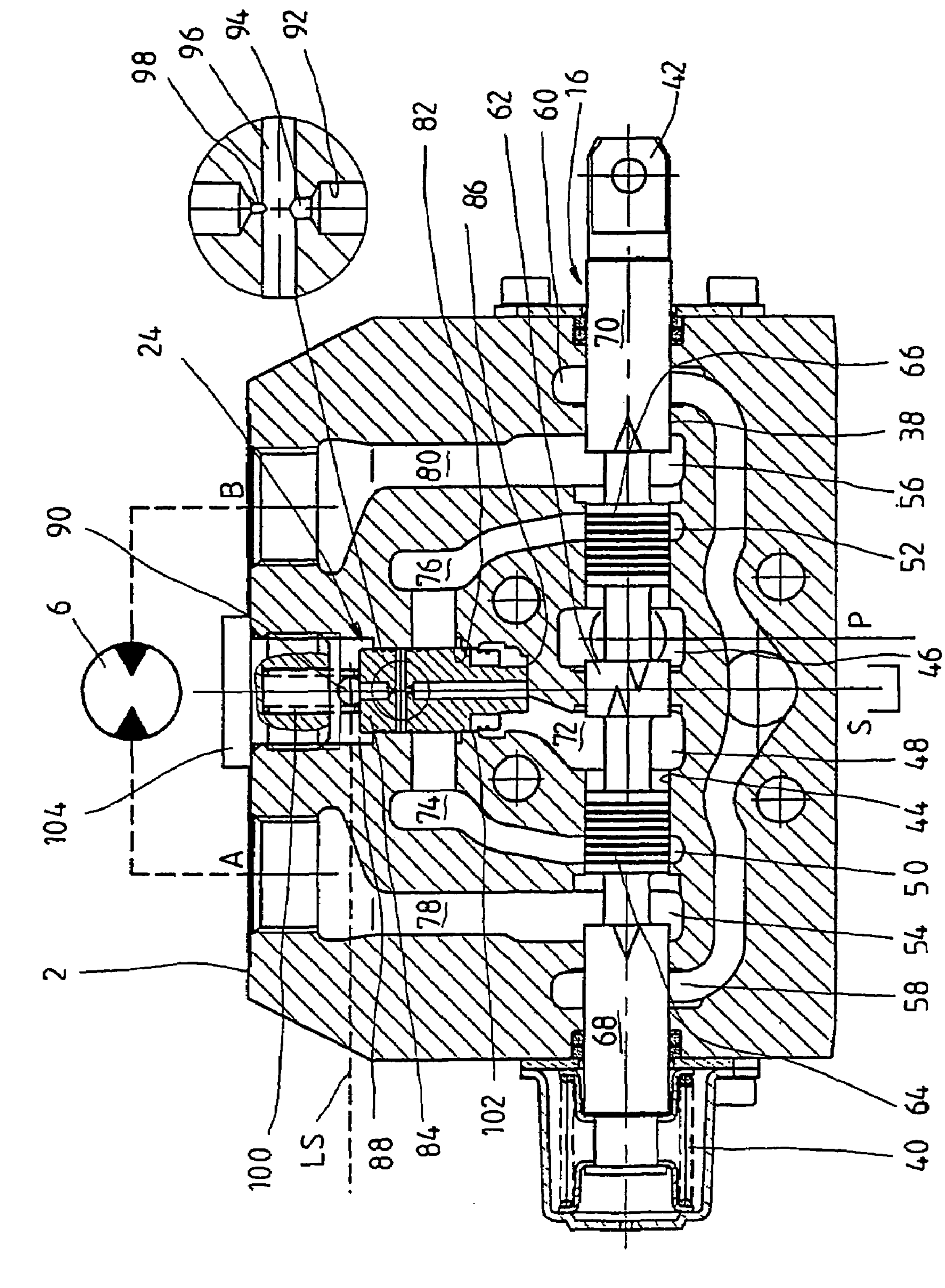

Hereinafter preferred embodiments of the invention shall be explained in greater detail by way of schematic drawings in which:

FIG. 1 shows a circuit diagram of a control block for a mobile working implement including at least one mechanically controllable consumer and FIG. 2 shows an enlarged representation of a valve disk of the control block from FIG. 1.

In FIG. 1 a control arrangement of a mobile working implement is shown, wherein users of the mobile working implement, for instance a mobile excavator, are controllable via a control block 1 including valve disks 2, 4. In the shown embodiment the function of a consumer, for instance a hydraulic motor 6 of a travel drive, is mechanically operated via an actuating lever and the function of a further consumer, for instance a hydraulic cylinder 8 operating the boom, is hydraulically operated.

In the shown embodiment the control block 1 is supplied with pressure medium via a fixed displacement pump 10 the pumped flow of which is controlled via a differential pressure regulator 12 in response to the maximum load pressure of the operated consumers. This load pressure is guided via an LS line 14 to a control face of the differential pressure regulator 12 effective in the closing direction, while the pump pressure is applied to the control face thereof effective in the opening direction.

Each of the valve disks 2, 4 includes a continuously adjustable distribution valve 16 which has directional members 20, 22 and a velocity member 18. The directional members 20, 22 control the pressure medium flow to and from the consumer and the velocity member 18 determines the volume flow of the pressure medium adjustable by opening a metering orifice. Downstream of this metering orifice a LUDV pressure compensator 24 is provided which—as described in the beginning—keeps the pressure drop above the metering orifice constant independently of the load. In the control position the individual load pressure of the corresponding consumer is applied to each pressure compensator 24 in the opening position and in the closing position the maximum load pressure tapped off by means of the LS line 14 is applied.

In the circuit shown in FIG. 1 the distribution valve 16 of the valve disk 2 is mechanical, for instance operated by an actuating lever, whereas the distribution valve 16 of the valve disk 4 is operated by a pilot device 26 which, in principle, consists of pressure reducing valves to the inlet of which a pressure provided by a control oil supply 28 is applied and at the outlet of which a control pressure is generated in response to the adjustment of the pilot device 26, the control pressure being applied to control chambers 31, 33 of the distribution valve 16 of the valve disk 4 for actuating the distribution valve 16. In the area between the control oil supply 28 and the pilot device 26 an electrically operated interrupting valve 30 is provided by which the control oil supply 28 can be connected to a reservoir T. In the operating position this interrupting valve 30 is changed over so that the pilot device 26 is supplied with control oil.

The area downstream of the interrupting valve 30 is connected via a control line 32 to a control chamber of a safety valve 34 in the form of a 2/2 port distributing valve. The safety valve 34 is biased by a spring into a switching position in which the LS line 14 is blocked. By changing over the interrupting valve 30 to its through-position the control oil supply pressure provided by the control oil supply 28 acts in the control chamber of the safety valve 34 so that the latter is brought into a through-position against the force of the spring.

In the area between the safety valve 34 and the differential pressure regulator 12 a flow regulator 36 is arranged by which the LS line 14 is connected to the reservoir T. That means, in the opening position of the safety valve 34 through the LS line a constant volume flow of control oil flows to the reservoir T whose size depends on the adjustment of the flow regulating valve 36. The pressure prevailing in the LS line 14 is limited via a pressure-limiting valve 37 arranged between the flow regulating valve 36 and the safety valve 34.

A structure of the valve disk 2 shall be explained hereinafter by way of the enlarged representation in FIG. 2.

Each of the afore-described valve disks 2, 4 has a pressure connection P to which the pump pressure is applied, a reservoir connection S connected to the reservoir, an LS connection LS connected to the LS line 14 as well as two working connections A, B connected to the consumer, in the present case the hydraulic motor 6.

A slide valve 38 of the distribution valve 16 of the valve disk 2 is biased into its represented home position by means of a centering spring arrangement 40. The slide valve 38 is operated by an operating portion 42 laterally projecting from the valve disk 2 to which an actuating lever or the like may be hinged.

The slide valve 38 is guided in a valve bore 44 which is extended in the radial direction to a pressure chamber 46, an inlet chamber 48, two outlet chambers 50, 52 arranged approximately symmetrically with respect to the pressure chamber 20, two working chambers 54, 56 arranged on both sides thereof as well as to two reservoir chambers 58, 60 adjacent to the latter.

The slide valve 16 has a central metering orifice collar 62 defining a metering orifice which forms the velocity member 18 jointly with the remaining annular land between the pressure chamber 46 and the inlet chamber 48. On both sides of this metering orifice collar 62 two control collars 64, 66 and two reservoir collars 68, 70 of the directional member 20, 22 are arranged at the slide valve 38.

The pressure chamber 46 is connected to the pressure connection P and the two reservoir chambers 58, 60 are connected to the reservoir connection S. The inlet chamber 48 is connected to the inlet of the pressure compensator 24 via an inlet passage 72. The outlet thereof is connected via two outlet passages 74, 76 to the outlet chamber 50, 52 and the two working chambers 54, 56 are connected via working passages 78, 80 to the working connection A or B, respectively.

In FIG. 2 the pressure compensator 24 is shown in its closed position. It has a pressure compensator piston 84 which is guided to be axially movable in a pressure compensator bore 82. The pressure compensator piston 84 is a step piston, the smaller piston surface being supported, in the closed position, on a shoulder 86 of the inlet passage 72. The pressure prevailing in the outlet passages 74, 76, i.e. the load pressure at the corresponding consumer is applied to the end face of the pressure compensator piston 84 facing said shoulder 86. The larger diameter (see FIG. 2 above) of the pressure compensator piston 84 dips into a rear control chamber 88 connected to the LS connection via an LS passage 90.

As one can especially take from the detailed representation in FIG. 2, the pressure compensator piston 84 includes an axial bore 92 opening in the stepped-back end face, the axial bore opening in a transverse bore 96 passing through the pressure compensator piston 84 in the transverse direction by means of a load detecting nozzle 94. The transverse bore is blocked in the closing and control position of the pressure compensator piston 84 by the circumferential walls of the pressure compensator bore 86 and is not opened before the pressure compensator 24 is completely opened. Then the control oil flows from the inlet of the pressure compensator via the load detecting nozzle into the control chamber 88 and thus into the LS line 14 so that the load pressure of the consumer is substantially applied as maximum load pressure in the LS line 14.

In the embodiment shown in FIG. 2 a further nozzle 98 via which the axial bore 92 is constantly connected to the control chamber 88 is provided in extension of the axial bore 92 on the other side of the transverse bore 96.

The pressure compensator piston 84 is moreover biased via a spring 100 against the shoulder 62 into its closed position in which the outer circumferential edge 102 of the stepping of the pressure compensator piston 84 has closed the connection between the inlet passage 72 and the outlet passages 74, 76. The spring 100 is supported on a screw plug 104 screwed into the pressure compensator bore 82.

The valve disk 4 allocated to the hydraulic function basically has the same structure, wherein the pressure compensator piston 106 is not designed to have a nozzle 98, however, and thus no constant connection is provided between the axial bore 108 and the control chamber 110. Moreover the pressure compensator piston 106 is not biased into its closed position by a spring.

When driving the hydraulic motor 6, the slide valve 16 is manually shifted by the actuating lever into an open position so that the metering orifice of the velocity member 18 is controlled to be opened. At the beginning of this control the pump pressure acting against the load pressure effective in the closing direction is applied to the inlet of the pressure compensator 24. The pump pressure increases until the pressure compensator piston 84 opens the connection to the outlet passages 74, 76. Then the pressure medium can flow via the directional members 20, 22 to the hydraulic motor 6 and from there back to the reservoir. If only the hydraulic motor 6 is operated, the pressure compensator 24 is brought into the completely opened position by the load pressure prevailing at the hydraulic motor 6 so that this load pressure is signaled to the LS line. When the boom is connected (hydraulic cylinder 8), the slide valve of the valve disk 4 is controlled by the pilot device 26. If the load pressure is higher at the hydraulic cylinder 8 than at the hydraulic motor 6, this higher load pressure is signaled in the above-described manner into the control chamber 110 of the valve disk 4 so that this higher control pressure acts upon the rear side of the pressure compensator 24 of the valve disk 2. The pressure compensator piston 84 is then displaced into a control position in which the pressure drop above the metering orifice of the valve disk 2 is kept constant independently of the load.

If the driver wants to leave his driver's seat, he has to operate the interrupting valve 30 first. This is done, for example, by a switch or the like. In this way the control oil supply of the pilot device 26 is blocked so that the distribution valve 16 of the valve disk 4 is returned to its home position and, accordingly, the hydraulic cylinder 8 is no longer driven. By changing over the interrupting valve 30 the reservoir pressure is also applied to the control line 32 so that the open safety valve 34 is brought into its closed position. Thus, the connection between the differential pressure regulator 12 and the individual valve functions is interrupted. The spring chamber of the differential pressure regulator 12 is relieved above the flow regulator 36 toward the reservoir T so that the differential pressure regulator 12 only can generate the standby pressure.

Since the volume flow of control oil from the pressure compensator 24 of the valve disk 2 via the axial bore 82, the transverse bore 96, the nozzle 98 and via the LS line 14 is interrupted and thus no more pressure drop occurs above the pressure compensator 24 due to this control oil flow, the pressure compensator piston 84 is pressure-compensated and is returned to its closed position by the force of the spring 100 and consequently the connection to the hydraulic motor 6 is blocked.

Thus, in the afore-described embodiment also all mechanically operated functions are locked by actuating the interrupting valve 30. It is also possible, of course, to actuate the interrupting valve 30 mechanically or electrically.

The dimensioning of the spring 100 and of the cross-section of the nozzle 98 is selected such that, one the one hand, a safe locking of the mechanically actuated valve disks 2 is permitted but, on the other hand, the above-described LUDV function is influenced to a small extent only.

In FIG. 1 a variant of the invention is shown according to which the nozzle 98' is not arranged in the pressure compensator piston 84 but in a branch line 112 by which the pressure medium flow path is connected downstream of the pump 10 and upstream of the metering orifice to a portion of the LS line 14 upstream of the safety valve 34. In the normal operating state, i.e. when the safety valve 34 is opened, via this nozzle 98' a control oil volume flow continuously flows through the flow regulator 36 off to the reservoir T. When changing over the safety valve 34, the pressure at the outlet of the pump acts by means of the nozzle 98' in the load detecting line 14 and thus in the control chamber 88 so that the pressure compensator 24 is likewise returned to its closed position.

A hydraulic control arrangement is disclosed for the control of a consumer, comprising at least one mechanically operated continuously adjustable distribution valve with a subsequent LUDV pressure compensator down the line. In order to lock the consumer the control arrangement is provided with a spring holding the pressure compensator piston in a closed position. Furthermore, the LS line carrying the highest load pressure of all consumers is connected to a reservoir by means of a flow regulator, wherein the pump control may also be relieved by the flow regulator in the sense of a reduction of the pumped volume. According to the invention, the LUDV pressure compensator is pressure-compensated by means of a nozzle through which a connection between the LS line and a portion of the pressure medium flow path downstream of the pump and upstream of the outlet of the pressure compensator is generated. Said nozzle is preferably integrated in the pressure compensator piston.

LIST OF REFERENCE NUMERALS

1 Control block
2 valve disk
4 valve disk
6 hydraulic motor
8 hydraulic cylinder
10 pump
12 differential pressure regulator
14 LS line
16 distribution valve
18 velocity member
20 directional member
22 directional member
24 LUDV pressure compensator
26 pilot device
28 control oil supply
30 interrupting valve
31 control chamber
32 control passage
33 control chamber
34 safety valve
36 flow control valve
37 pressure-limiting valve
38 slide valve
40 centering spring arrangement
42 operating portion
44 valve bore
46 pressure chamber
48 inlet chamber
50 outlet chamber
52 outlet chamber
54 working chamber
56 working chamber
58 reservoir chamber
60 reservoir chamber
62 metering orifice collar
64 control collar

66 control collar
68 reservoir collar
70 reservoir collar
72 inlet passage
74 outlet passage
76 outlet passage
78 working passage
80 working passage
82 pressure compensator bore
84 pressure compensator piston
86 shoulder
88 rear control chamber
90 LS passage
92 axial bore
94 load-detecting nozzle
96 transverse bore
98 nozzle
100 spring
102 outer circumferential edge
104 screw plug
106 pressure compensator piston (4)
108 axial bore (4)
110 control chamber (4)
112 branch line

The invention claimed is:

1. A hydraulic control arrangement for the control of a consumer, comprising at least one mechanically operated continuously adjustable distribution valve with a subsequent pressure compensator down the line to which a load pressure of the corresponding consumer is applied in an opening direction and a highest load pressure of all controlled consumers is applied in the closing direction to a rear control chamber, wherein said highest load pressure is carried via an LS line to a pump regulator of a pump, wherein upon operation of a safety valve, the pressure compensator is brought into a closing position for closing the connection to the consumer, wherein a pressure compensator piston is moved toward its closed position by a spring, the LS line is connected to the reservoir by means of a flow control valve, the safety valve is arranged in the LS line between the pump regulator and the pressure compensator; and a pressure is tapped off by a first throttle from a pressure medium flow portion downstream of the pump and upstream of an outlet of the pressure compensator, and directed to the rear control chamber, upon a changeover of an interrupter valve.

2. A control arrangement according to claim 1, wherein the first throttle is integrated in the pressure compensator piston and connects the rear control chamber to an inlet of the pressure compensator.

3. A control arrangement according to claim 2, wherein the pressure compensator piston has an axial bore opening via a load detecting throttle into a transverse bore which is controlled to be opened when the pressure compensator is completely opened, wherein the first throttle connects the transverse bore to the rear control chamber.

4. A control arrangement according to claim 3, wherein the first throttle has a smaller cross-section than a load detecting throttle of the pressure compensator piston.

5. A control arrangement according to claim 2, wherein the pump regulator is a differential pressure regulator and the pump is a fixed displacement pump.

6. A control arrangement according to claim 2, wherein the function of a further consumer is hydraulically controlled by means of a pilot device connected to a control oil supply, wherein the control oil supply is disconnected from the pilot device by the interrupting valve, wherein the safety valve is brought into its locked position by means of the interrupting valve.

7. A control arrangement according to claim 2, wherein the first throttle has a smaller cross-section than a load detecting throttle of the pressure compensator piston.

8. A control arrangement according to claim 1, wherein the first throttle is arranged in a branch line extending between the outlet of the pump and a portion of the LS line upstream of the safety valve.

9. A control arrangement according to claim 8, wherein the pump regulator is a differential pressure regulator and the pump is a fixed displacement pump.

10. A control arrangement according to claim 8, wherein the function of a further consumer is hydraulically controlled by means of a pilot device connected to a control oil supply, wherein the control oil supply is disconnected from the pilot device by the interrupting valve, wherein the safety valve is brought into its locked position by means of the interrupting valve.

11. A control arrangement according to claim 8, wherein the first throttle has a smaller cross-section than a load detecting throttle of the pressure compensator piston.

12. A control arrangement according to claim 1, wherein the pump regulator is a differential pressure regulator and the pump is a fixed displacement pump.

13. A control arrangement according to claim 12, wherein the function of a further consumer is hydraulically controlled by means of a pilot device connected to a control oil supply, wherein the control oil supply is disconnected from the pilot device by the interrupting valve, wherein the safety valve is brought into its locked position by means of the interrupting valve.

14. A control arrangement according to claim 12, wherein the first throttle has a smaller cross-section than a load detecting throttle of the pressure compensator piston.

15. A control arrangement according to claim 1, wherein the function of a further consumer is hydraulically controlled by means of a pilot device connected to a control oil supply, wherein the control oil supply is disconnected from the pilot device by the interrupting valve, wherein the safety valve is brought into its locked position by means of the interrupting valve.

16. A control arrangement according to claim 15, wherein the first throttle has a smaller cross-section than a load detecting throttle of the pressure compensator piston.

17. A control arrangement according to claim 1, wherein the first throttle has a smaller cross-section than a load detecting throttle of the pressure compensator piston.

* * * * *